Figure 5:
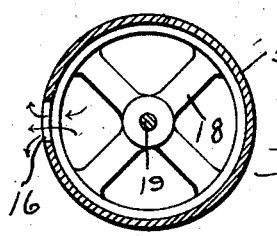

Oct. 4, 1927.
P. L. CROWE
1,644,565
CENTRIPETAL COMPRESSOR
Filed July 25, 1925      3 Sheets-Sheet 1
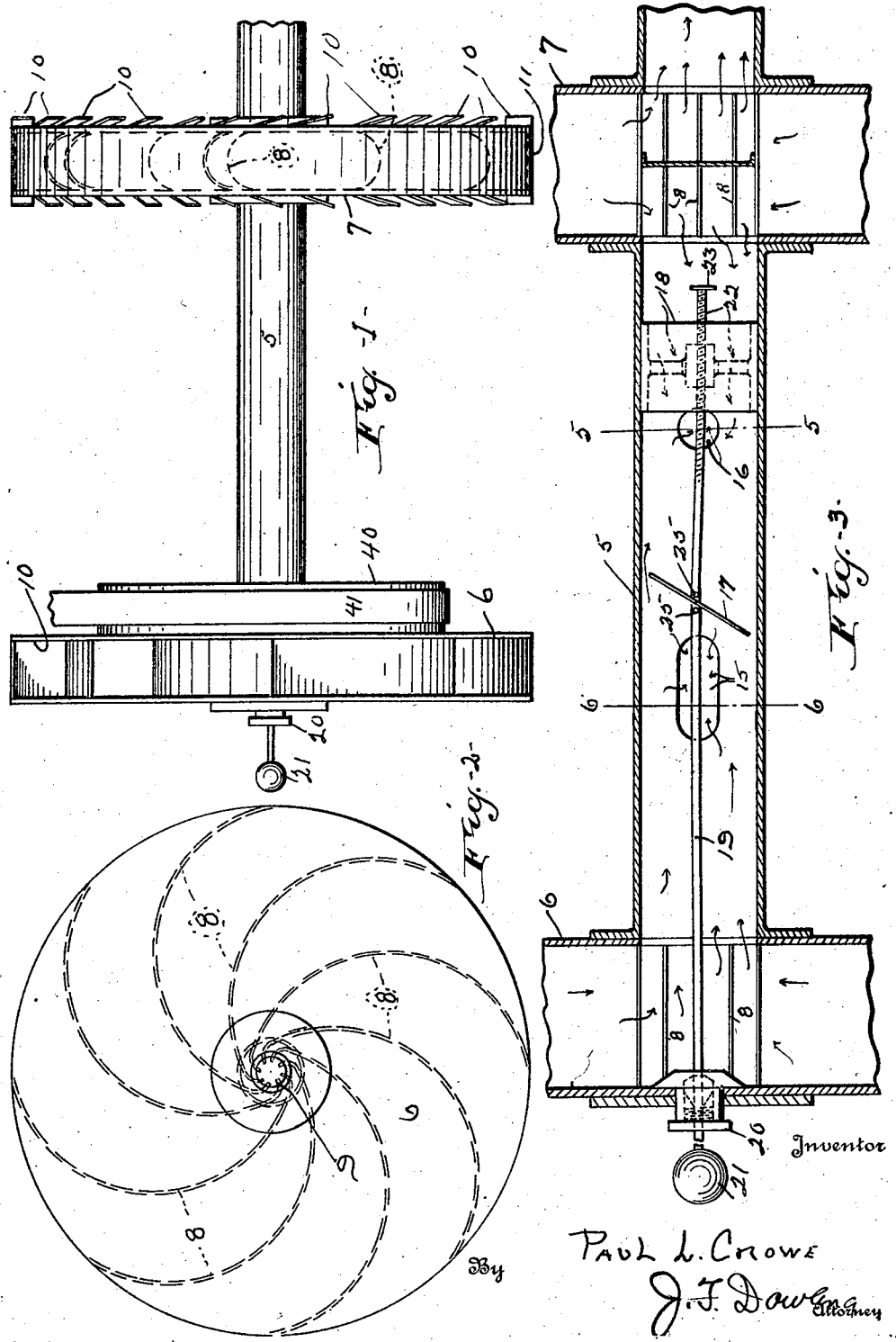
Paul L. Crowe Oct. 4, 1927. 1,644,565
P. L. CROWE
CENTRIPETAL COMPRESSOR
Filed July 25, 1925  3 Sheets-Sheet 2

Inventor
Paul L. Crowe
By J. T. Dowling
Attorney

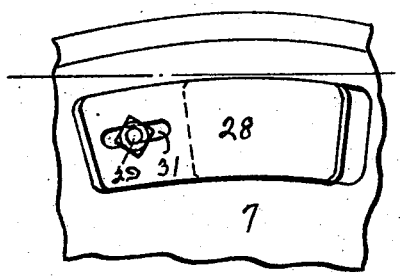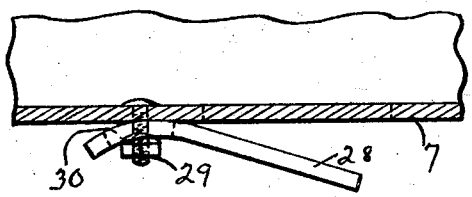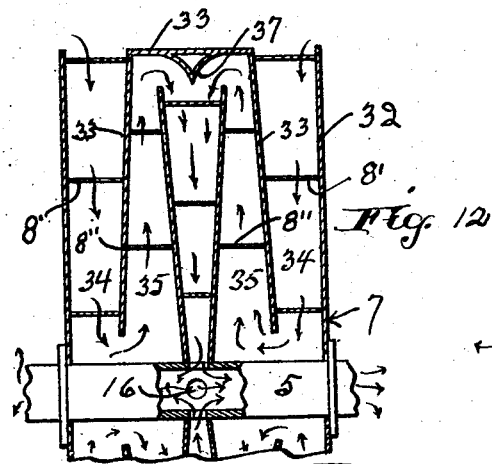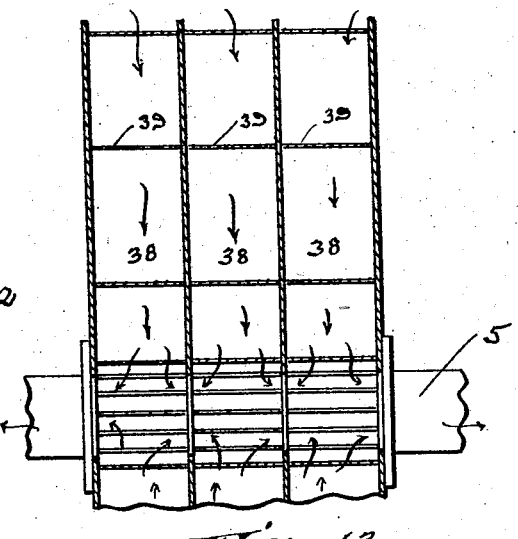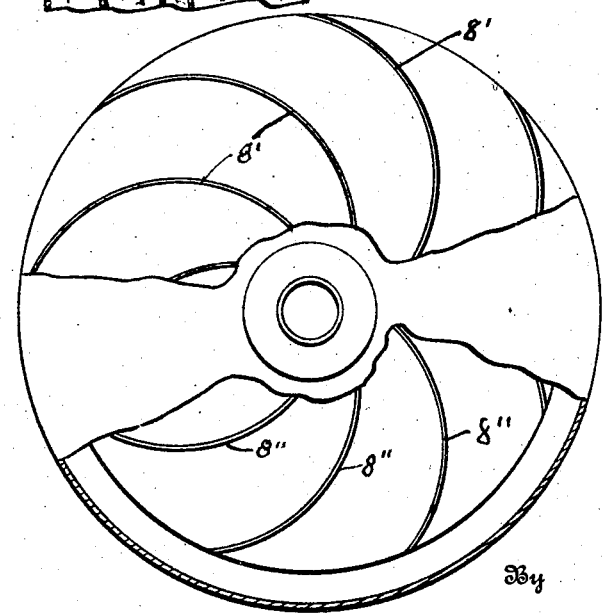

Patented Oct. 4, 1927.

1,644,565

UNITED STATES PATENT OFFICE.

PAUL L. CROWE, OF BALTIMORE, MARYLAND.

CENTRIPETAL COMPRESSOR.

Application filed July 25, 1925. Serial No. 46,120.

This invention relates to centripetal compressors and has as an object the provision of rotors equipped with vanes so as to permit a collection of air into the rotors and means for distributing the air collected by the rotors.

A further object of this invention is the provision of an air collector and compressor, including rotors equipped with vanes mounted on a hollow shaft for the purpose of collecting air, compressing the same and discharging it through the hollow shaft.

A still further object of the invention is to provide rotors having impellers and vanes formed integral therewith for the purpose of collecting and compressing air and forcing the same into a hollow shaft, upon which said rotors are mounted.

Another object of the invention is the provision of a hollow shaft having mounted thereon and in communication therewith, air collecting rotors for the purpose of collecting and compressing the air into said shaft and means in said shaft to permit of the outlet of said air for the purpose of operating other machines.

A still further object of the invention is the provision of a centripetal compressor embodying rotors mounted on a hollow shaft equipped with air collecting and compressing vanes, and a means in the shaft for controlling the discharge of the air therefrom.

A further object of the invention is the provision of a centripetal compressor particularly adapted for the collection of fluids, delivering the same at a higher pressure comparative to speed, size, multiplicity, or multiplication, with a comparatively simple and durable form of impellers.

Another and important object of this invention is the provision of a hollow shaft having mounted thereon and rotatable therewith, air collecting rotors including means for compressing the air after collected in the rotors, forcing the same into the shaft, and a means longitudinally of the shaft for the controlling of the discharge of the air from the shaft.

With these and other objects in view, the invention consists in certain novel features, combination and arrangement of parts hereinafter more fully described, illustrated in the accompanying drawings, and claimed.

Figure 4:
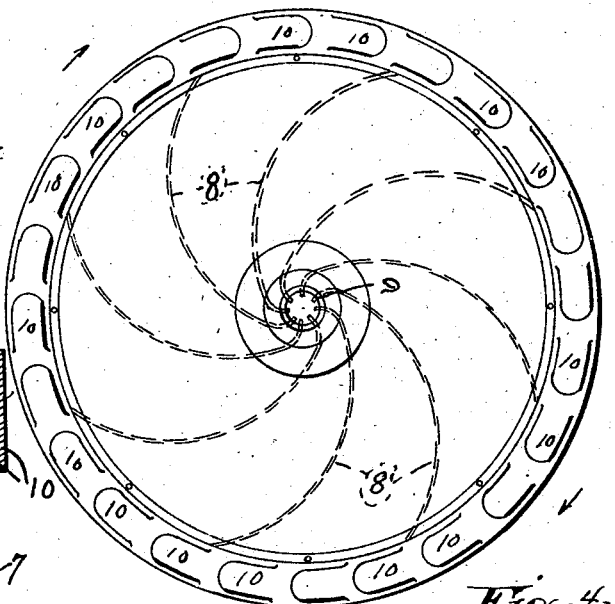
Figure 7:
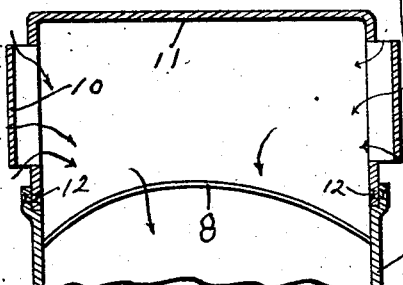
Figure 6:
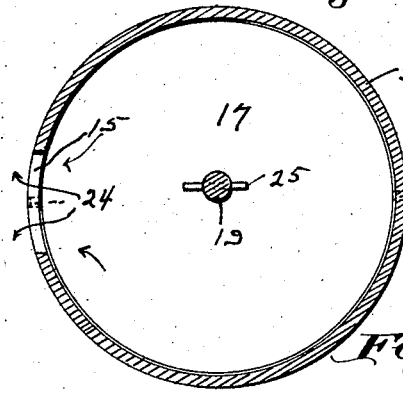
Figure 8:
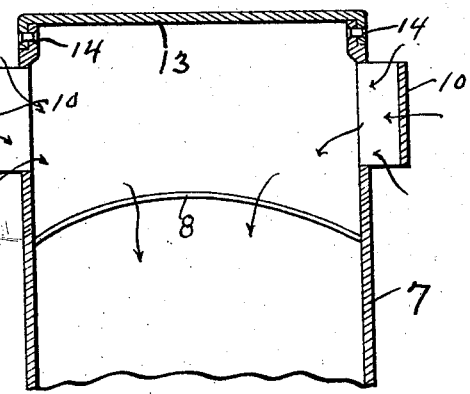
Figure 9:
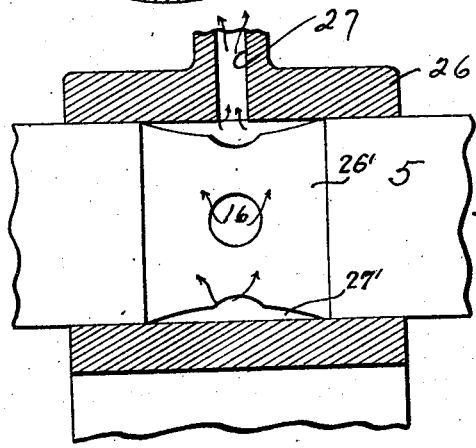

In the drawings,

Figure 1 is an elevational view illustrating my improved centripetal compressor, as made in accordance with this invention, Figure 2 is a side elevational view of one of the rotors, illustrating the vanes in dotted lines, Figure 3 is a fragmentary, longitudinal, sectional view of the shaft and rotors, illustrating the air controlling means, Figure 4 is a side elevational view of one of the rotors, Figure 5 is a transverse sectional view taken on the line 5—5 of Figure 3, Figure 6 is a transverse sectional view taken on the line 6—6 of Figure 3, Figure 7 is a slightly modified form of a fragmentary portion of one of the rotors, illustrating the air collectors, Figure 8 is a modified form of the rotors, showing the air collectors struck from the sides of the rotor casing, Figure 9 is a fragmentary, longitudinal, sectional view of a bearing sleeve member embracing the hollow shaft, for the purpose of conveying the compressed air from the hollow shaft to other machines, Figure 10 is a fragmentary, side elevational view of one of the rotor wheels, illustrating the later equipped with an adjustable air collector, Figure 11 is a top plan view, partly in section, illustrating the construction shown in Figure 10, Figure 12 is a vertical, sectional view, illustrating a modified form of one of the rotors, this form showing a multistage construction, Figure 13 is a vertical, sectional view, illustrating a modified form of the rotor, clearly demonstrating how the rotors can be built in series, and, Figure 14 is a fragmentary, enlarged, sectional view of the modification shown in Figure 12, the upper half illustrating the construction with the outer wall broken away, disclosing the curvature of the vanes, while the lower half has the inner wall broken away to illustrate the reverse curvature of its vanes.

Like numerals of references designate corresponding parts throughout the several views of the drawings.

Referring to the drawings, the numeral 5 indicates a hollow shaft having secured thereto and rotatable therewith, rotor wheels 6 and 7, respectively. The rotor wheels are secured to the shaft in any manner suitable for the purpose and each are hollow in direct communication with the interior of the shaft 5.

The rotors 6 and 7, respectively, are provided on their interiors with relatively spaced air collecting and compressing vanes 8, and these vanes converge from the outer periphery to the central axis 9 of the rotors where they are ended.

The rotor 6 is illustrated as having its periphery fully open as at 10, while the rotor 7 has its periphery closed as at 11, it being understood that the rotors 6 and 7 can be used selectively or collectively, as desired, the particular form being decided upon by the user.

When the rotor 7 is constructed, its side walls are provided adjacent its periphery with a plurality of relatively spaced circumferentially arranged air collectors or buckets 10, this being more clearly illustrated in Figures 4, 7 and 8.

The illustrations of the modified forms in Figures 7 and 8, show the rotor 7 being equipped with the usual vanes 8, and illustrate the manner in which the periphery of this rotor may be closed. In Figure 7, the rotor 7 is equipped with a substantially U-shaped hood in cross section 11, and this hood has the terminals of its arm portions secured to the periphery of the rotor 7 by a suitable fastening means 12, such as bolts or the like. The side walls of the hood 11 are provided with the usual air collectors 10, as previously described and illustrated in Figure 4.

In the modification illustrated in Figure 8, the rotor casing 7 has its end closed by an annular cap 13, which is fastened thereto by suitable fastening means 14, such as bolts or the like. The side walls of the rotor casing 7 are provided adjacent its outer periphery with the air collectors 10 which are stamped directly from the casing 7, as clearly illustrated in this modification.

It is to be clearly understood that any form of the constructions shown can be used without departing from the efficiency, and accuracy in operation of the rotors.

The hollow shaft 5 is provided with air outlet openings 15 and 16, respectively, and it is to be understood that while only two openings are illustrated in the drawing, that as many openings as desired may be provided. These openings permit the air gathered in the shaft under compression through the medium of the rotors 6 and 7 and their vanes 8, to be discharged from the shaft for various purposes.

To control the air passing out of the shaft 5, I have provided a damper 17 and valve 18, each mounted and controlled within the shaft by a common controlling rod 19, supported in a stuffing box, 20, which is secured centrally to the outer face of the rotor 6, and secured to the outer terminal of this rod 19 is an operating handle 21. The inner end of the rod is screw threaded as at 22, and has formed on its extreme inner terminal a stop 23, and the threaded portion of this rod receives and supports the valve 18, and by turning this rod in clock or counterclockwise position the opening 16 will be opened or closed by longitudinal movement of the valve 18, through the medium of the threads on rod 19.

The damper 17 is journaled on trunnions 24 at diametrically opposite points in the shaft 5, and the rod extends through this damper 17 slightly off center, and this rod is provided with spaced controlling pins 25 arranged in close proximity to each face of the damper 17, whereupon by movement, either inward or outward, of the rod 19, the damper will be opened or closed relative to the shaft 5. When the damper is closed the air gathered into the shaft by the rotor 7 is more or less prevented from escaping through the opening 15, but when the damper is opened in full position, as illustrated in Figure 3, air more or less throttled can pass out through opening 15.

The endwise movement of the rod affects the opening or closing of the side outlets of the shaft according to the position of the sleeve adjustment on the rod to and from the damper.

To provide a means for using the compressed air, flowing from the shaft 5, I have illustrated in Figure 9, a method of connecting the shaft 5 in series with other machinery through the medium of a hollow shaft 26, or other body. This shaft 26 embraces the shaft 5, and the shaft 5 is provided with a hollow or cut-out portion 26′ in its periphery, so as to form an air chamber 27′ in which air is collected prior to its outlet through the opening 27 of the shaft 26. This shaft 26 permits air to be conveyed in any direction therefrom and the opening 16 is controlled by the valve 18 through the medium of the damper rod 19. It is to be understood that any preferred method of mounting constructions, such as shaft 26 to shaft 5, may be adopted, and it is not the intention of describing this one form to eliminate other desirable ones. It is also to be understood that shaft 5 may be equipped with as many rotors as desired, the only requirement necessary being that the rotors are in direct communication with the interior of the shaft 5.

Referring to the modification, illustrated in Figures 10 and 11, there is illustrated the casing of the rotor 7, and instead of striking the air collectors 10 directly from the casing or hood, as illustrated in Figures 4, 7, and 8, I have provided an adjustable air collector 28, which is fastened by one end, as at 29, to the casing of the rotor 7. The fastening 29 is here illustrated as a bolt and nut, but it is to be understood that any preferred fastening means may be used. The attached end of the collector 28 is curved as at 30, and provided with a longitudinally extending slot 31, and through the medium of this slot this air collector can be regulated in its distance relative to the opposed side face of the casing 7.

Referring to the modification illustrated in Figure 12, I have provided a rotor casing 32 with fixed central partitions 33. The central partitions 33 divide the casing into outer chambers 34, and inner chambers 35, respectively. The vanes 8' in the outer chambers 34 are curved in one direction, as illustrated in the upper half of Figure 14, while the vanes 8'' are curved in the opposite direction, as illustrated in the lower half of Figure 14. Thus it will follow, that when air is collected in the outer chambers 34, it passes from chambers 34 into chambers 35 and is then forced downwardly into central chamber 36, into shaft 5, the passage of air being clearly illustrated by the arrows in this figure. The central partition 33 is provided on the interior of its webbed portion, with an air deflecting means 37, and this construction is used where air is needed under higher pressure or compression.

Referring to the modification illustrated in Figure 13, I have illustrated a rotor with a multicasing of air collecting chambers 38, each equipped with vanes 39. The use of this construction is to show that a single rotor can be constructed into series, by simply adding more air collecting compartments with their respective vanes.

The shaft 5 and rotors may be driven by a suitable drive wheel 40, carried by one of the rotors, over which passes a drive belt 41. It is to be understood, however, that this is only one form of driving mechanism, that any particular power, such as electric, steam, or otherwise, may be adapted for driving the rotors and shaft.

It is to be understood that minor changes may be made to the various constructions, as illustrated, without departing from the spirit and scope of the invention as claimed.

Having thus described my invention, what I claim as new is:

1. A centripetal compressor comprising a hollow shaft, rotors mounted on said shaft, air collectors carried by said rotors, air compressors formed in said rotors, means for controlling the discharge of air delivered from said rotors into said shaft, and said means carried by one of said rotors and located in said shaft.

2. A centripetal compressor comprising a hollow rotatable shaft having rotors mounted thereon and in communication therewith, means for rotating said shaft and rotors, air outlets formed in said shaft, air collectors and compressors carried by said rotors, and manually operated means for controlling the flow of air from the shaft through the outlets formed therein.

In testimony whereof he hereunto affixes his signature.

PAUL L. CROWE.